UNITED STATES PATENT OFFICE.

WILLIAM RALPH DODD, OF LONDON, ENGLAND.

PROCESS OF PREPARING INFANTS' FOODS.

SPECIFICATION forming part of Letters Patent No. 612,561, dated October 18, 1898.

Application filed November 5, 1897. Serial No. 657,482. (No specimens.) Patented in England December 10, 1891, No. 21,631.

*To all whom it may concern:*

Be it known that I, WILLIAM RALPH DODD, of Dunsmure road, Stamford Hill, London, England, have invented certain new and useful Improvements in the Preparation of Food Suitable for Infants, of which the following is a specification, and for which a patent has been obtained in Great Britain, No. 21,631, dated December 10, 1891.

This invention has for its object the production of a food suitable for infants of tender age, especially for those to whom it is inconvenient to supply human milk.

Hitherto sweetened or unsweetened condensed cow's milk has been largely used as a food-supply for infants, and it possesses without doubt considerable nutritive power; but it is within the experience of medical men that such food in many cases cannot be retained in the stomach and is rejected in the familiar form of curds, with the result that the digestive apparatus of the infant is disturbed. It is also defective as a food for infants by reason of a deficiency of albumen, fat, and other important substances, so that it must be regarded as falling far short of a perfect substitute for human milk or of a completely suitable food for infants.

By my invention I remove a portion of the casein contained in cow's milk, and I supply the deficiency of albuminoid matter (albumen) and of lactose, and I then sterilize and condense the resulting product, so that it may be put up in tins or other convenient vessels in a form convenient for storage and transit. When suitably diluted and heated in a manner to be hereinafter described, the food is ready for immediate use.

In preparation of this food I proceed as follows: Of the milk to be employed in the production of the food two-thirds, by measure, are separated from the remaining third. From the two-thirds thus obtained the cream is separated by any known and convenient means, and after the removal of this cream I precipitate the whole of the casein by means of a sufficiency of rennet or other suitable precipitant of casein and remove the precipitated casein from the milk by straining or other convenient means. I next heat the liquid thus obtained to boiling in order to prevent any subsequent action of the rennet or other added casein precipitant. If necessary after this operation, I again filter off or remove any precipitated matter. To the product thus obtained I return the cream previously removed, together with the one-third of untreated milk set aside from the original quantity taken, and to this mixture I add, for every one hundred pounds weight (avoirdupois) of cow's milk originally taken, one and one-fourth pounds (avoirdupois) of milk-sugar and one and one-fourth pounds (avoirdupois) of peptone or of a suitable soluble albumen in equivalent proportion with respect to its contained nitrogen, such as a cold aqueous extract of ground wheat prepared with soft water, to which salt has been added in the proportion of, say, three ounces (avoirdupois) of common salt to every fourteen pounds wheat used.

The mixture is sterilized by boiling and is rendered slightly alkaline by the addition of a sufficiency of carbonate or bicarbonate of sodium or calcium or by lime-water, (hydrate of lime,) which latter I prefer to use. The compound is next strained and finally evaporated in a vacuum-pan to such a consistency that the final product weighs from twenty pounds to twenty-five pounds avoirdupois. It is then in the form of a paste and in this condition is transferred to suitable vessels, which are hermetically sealed with a view to exclude air. The food thus prepared will be most conveniently administered when diluted with water in the proportion of one of food to four of water or of one of food to five of water. It should be mentioned that, if desired, in order to make the food more palatable about two per cent. of cane-sugar may be added.

It is to be understood that in the preparation of this food I do not bind myself absolutely to the proportions above set forth; but I indicate them as those which I find generally suitable for arriving at the standard at which I aim. In manufacturing, however, it is necessary before commencing to make the food to chemically test the milk for casein and fat. If found to be deficient in either, the deficiency is made good. If excessive, the excess is removed. These precautions are demanded in view of the variable composition of cows' milk in respect of casein and fat, the proportions here given being those most suitable when the milk is of normal quality. By "normal" milk I understand milk that has approximately the following percentage composition: total dry solids, 12.83; casein, 3.02; albumen, 0.53; fat, 3.69, and lactose, 4.88.

I claim—

1. The process of producing food from milk suitable for infants and consisting in removing a portion of the casein from the milk, supplying the deficiency of albumen and lactose and then sterilizing and condensing the resulting product, as herein set forth.

2. The process of producing food from milk, suitable for infants and consisting in dividing the quantity of milk to be treated, removing from one portion the cream, precipitating the casein from said portion by suitable means and removing precipitate, boiling the liquid and returning the cream and other portion of milk, adding milk-sugar and a suitable soluble albumen, in or about the proportions given and sterilizing and condensing the resulting product, substantially as herein set forth.

3. The process of producing food from milk, suitable for infants, and consisting in removing a portion of the casein, supplying albumen and lactose, sterilizing the resulting product and then adding a proportion of an alkali and condensing the whole, as herein set forth.

4. In the preparation of a food from milk suitable for infants, the process of treating the milk for subsequent use and consisting in dividing the quantity of milk into two portions, removing the cream from one, treating the skim-milk with a suitable material as rennet to precipitate the casein, removing the precipitate, boiling, and then returning the cream and untreated milk as and for the purpose set forth.

W. RALPH DODD.

Witnesses:
ALFRED S. BISHOP,
H. E. NEWTON.